United States Patent
Shamoto et al.

(10) Patent No.: US 6,776,563 B2
(45) Date of Patent: Aug. 17, 2004

(54) METHOD OF CONTROLLING ELLIPTICAL VIBRATOR

(76) Inventors: Eiji Shamoto, 27-9, Nishimachi 4-chome, Ibukidai, Nishi-ku, Kobe-shi, Hyogo (JP); Norikazu Suzuki, 3-20-19, Yamate-cho, Suita-shi, Osaka (JP); Toshimichi Moriwaki, 10-6, Gakuenhigashimachi 7-chome, Nishi-ku, Kobe-shi, Hyogo (JP); Makoto Matsuo, c/o Towa Corporation, 5, Kamitoba Kamichoshi-cho, Minami-ku, Kyoto-shi, Kyoto (JP)

( * ) Notice: Subject to any disclaimer, the term of this patent is extended or adjusted under 35 U.S.C. 154(b) by 137 days.

(21) Appl. No.: 10/081,067

(22) Filed: Feb. 21, 2002

(65) Prior Publication Data

US 2002/0119021 A1 Aug. 29, 2002

(30) Foreign Application Priority Data

Feb. 23, 2001 (JP) ........................................ 2001-048885

(51) Int. Cl.$^7$ ........................... B23B 1/00; B23D 79/00; H01L 41/08
(52) U.S. Cl. ........................ 409/293; 409/289; 409/292; 82/1.11; 82/11.3; 82/12; 82/163; 82/118; 82/904; 310/323.16; 310/323.18
(58) Field of Search ............................... 409/345, 293, 409/289, 292, 141; 82/1.11, 12, 1.3, 1.5, 11.3, 118, 904, 163; 310/323.16, 323.18; 408/143

(56) References Cited

U.S. PATENT DOCUMENTS

| | | |
|---|---|---|
| 2,736,144 A | 2/1956 | Thatcher |
| 3,559,259 A | 2/1971 | Kumabe |
| 4,455,469 A | 6/1984 | Inoue |
| 4,651,599 A | 3/1987 | Ley |
| 4,742,260 A | 5/1988 | Shimizu et al. |
| 4,856,391 A | 8/1989 | Mishiro |
| 4,911,044 A | 3/1990 | Mishiro et al. |
| 5,218,893 A | 6/1993 | Shikata |
| 5,438,229 A | 8/1995 | Ohtsuchi et al. |
| 5,448,128 A | 9/1995 | Endo et al. |

(List continued on next page.)

FOREIGN PATENT DOCUMENTS

| | | |
|---|---|---|
| DE | 100004062 | 8/2000 |
| EP | 0923144 | 6/1999 |
| EP | 0979700 | 2/2000 |
| FR | 2178367 | 10/1973 |
| JP | 64-77484 | 3/1989 |

(List continued on next page.)

OTHER PUBLICATIONS

J. Simonet, "Les vibrations forcée de l'outil et son comportement", C.I.R.P. ANNALEN. vol. 10, No. 3, 1961, p. 398 XP002155184, Figs. 2, 3 (with partial English translation).

(List continued on next page.)

Primary Examiner—A. L. Wellington
Assistant Examiner—Erica E Cadugan
(74) Attorney, Agent, or Firm—W. F. Fasse; W. G. Fasse (57) ABSTRACT

An elliptical vibratory cutting apparatus includes a control mechanism which applies a sinusoidal voltage having a predetermined phase difference to piezoelectric elements. Flexure vibrations are accordingly generated in X and Y directions. The vibrations in the X direction cause interference with the vibrations in the Y direction and vice versa. An amount of interference, caused by vibrations in one direction, with vibrations in another direction, is correctively eliminated by the control mechanism (interference eliminating unit. A workpiece is thus cut by means of a cutting tool through elliptical vibrations with high precision.

6 Claims, 5 Drawing Sheets

U.S. PATENT DOCUMENTS

| | | | |
|---|---|---|---|
| 5,548,176 A | | 8/1996 | Oda |
| 5,760,527 A | | 6/1998 | Ashizawa |
| 5,913,955 A | * | 6/1999 | Redmond et al. ............. 82/1.11 |
| 6,242,846 B1 | * | 6/2001 | Ashizawa et al. ..... 310/323.02 |
| 6,637,303 B2 | * | 10/2003 | Moriwaki et al. ............. 82/1.4 |
| 2002/0036091 A1 | * | 3/2002 | Claesson et al. ......... 173/162.1 |
| 2002/0057040 A1 | * | 5/2002 | Shibatani ............... 310/323.16 |
| 2002/0083805 A1 | * | 7/2002 | Lundblad ..................... 82/1.11 |

FOREIGN PATENT DOCUMENTS

| | | | |
|---|---|---|---|
| JP | 2164285 | | 6/1990 |
| JP | 3-73201 | | 3/1991 |
| JP | 3-86087 | | 4/1991 |
| JP | 7-68401 A | * | 3/1995 |
| JP | 2000-52101 A | * | 2/2000 |
| JP | 2000-218401 | | 8/2000 |
| JP | 2001-113401 A | * | 4/2001 |
| SU | 986605 | | 1/1983 |
| WO | WO00/25963 | | 5/2000 |

OTHER PUBLICATIONS

Development of Tool Vibration System for Ultrasonic Elliptical Vibration Cutting Tool:, the Japan Society for Precision Engineering, 1998 KANSAI Area Annual Conference Jul. 31 and Aug. 1, 1998.

"Development of Tool Vibration System for Ultrasonic Elliptical Vibration Cutting Tool", Proceedings of 1997 Autumn Conference of The Japan Society for Precision Engineering, Oct. 1, 2, and 3, 1997.

"Ultraprecision Diamond Cutting of Die Steel by Applying Ultrasonic Elliptical Vibration Cutting", International Conference and Exhibition on Design and Production of Dies and Molds Conference Proceedings, Jun. 19–21, 1997, by E. Shamoto et al.; pp. 105–110.

* cited by examiner

——●—— GAIN, PHASE DELAY IN CUTTING DIRECTION (Y DIRECTION)
——○—— GAIN, PHASE DELAY IN BITING DIRECTION (X DIRECTION)

FIG. 5

METHOD OF CONTROLLING ELLIPTICAL VIBRATOR

BACKGROUND OF THE INVENTION

1. Field of the Invention

The present invention relates to improvements in a method of controlling an elliptical vibrator. The elliptical vibrator is used for processing a workpiece such as steel product by causing elliptical vibrations to a tool, for example.

2. Description of the Background Art

An elliptical vibratory processing apparatus has been used for processing a workpiece into a required shape. The elliptical vibratory processing apparatus for example has an elliptical vibrator which is formed of a body in the shape of an octagonal prism and step horns provided respectively on both ends of the body. One of the step horns has its end provided with a tool and this tool elliptically vibrates to process the workpiece.

Specifically, driving piezoelectric elements of a required number are provided to the elliptical vibrator. A predetermined sinusoidal voltage having a predetermined phase difference (e.g. 90°) is applied individually to the driving piezoelectric elements. Accordingly, flexure vibrations are caused to the elliptical vibrator in each of the horizontal direction (X direction) and the vertical direction (Y direction). The flexure vibrations in the two directions of the elliptical vibrator are mechanically synthesized. Then, an end (cutting edge) of the tool, which is provided to the elliptical vibrator, is allowed to draw a trajectory of elliptical vibrations (see FIG. 3).

Figure 3:
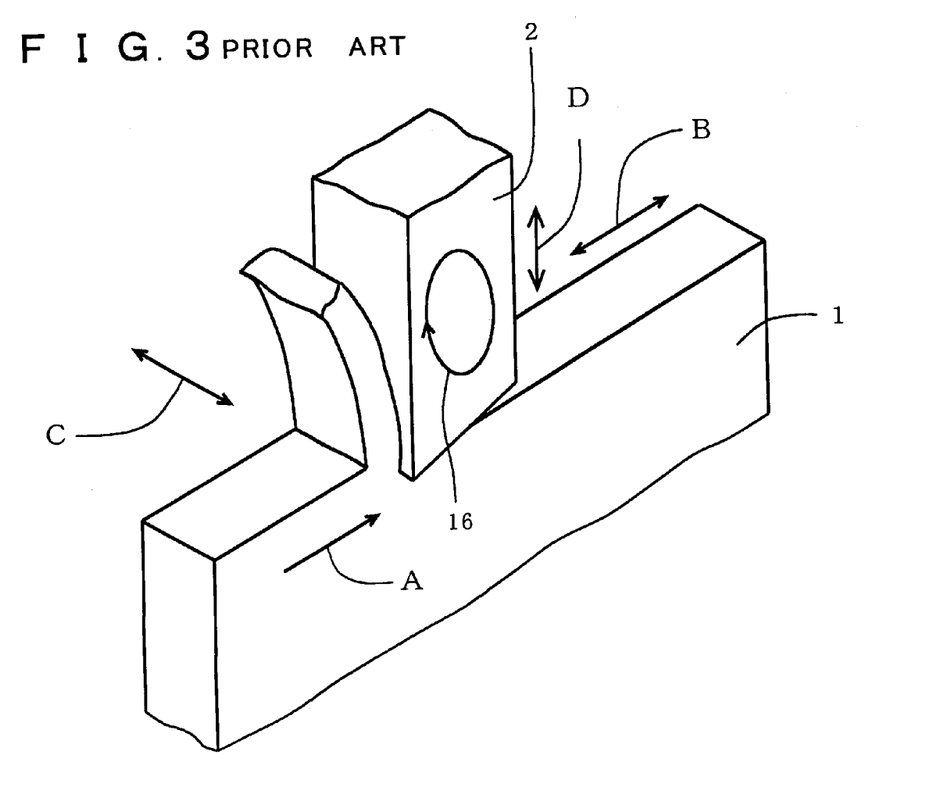
FIG. 3 is an enlarged schematic perspective view of the apparatus shown in FIG. 1, showing an enlarged cutting tool portion of the apparatus to illustrate that a workpiece is cut by a cutting tool of the apparatus whereby the cutting tool and its basic vibratory cutting operation are generally conventional.

For the cutting operation shown in FIG. 3 for example, the cutting tool 2 is caused to elliptically vibrate with respect to the workpiece 1 to be cut and move in a cutting direction indicated by "A" relatively with respect to workpiece 1, so that cutting tool 2 can elliptically vibrate to cut workpiece 1.

Suppose that the distance by which cutting tool 2 moves in cutting direction A is constant. Then, a higher steadiness with which the edge of cutting tool 2 draws an elliptical trajectory 16 in a required shape (preset target shape) enables workpiece 1 to be processed with higher precision through the elliptical vibrations.

Here, the flexure vibrations in the two directions as described above interfere with each other to cause tool interference.

For example, the horizontal flexure vibrations of the elliptical vibrator interfere with (impede) the vertical flexure vibrations. Then, it is impossible to control the vertical flexure vibrations for allowing the vertical flexure vibrations to have a required amplitude.

As the horizontal flexure vibrations, the vertical flexure vibrations of the elliptical vibrator also interfere with the horizontal flexure vibrations, which makes it impossible to control the horizontal flexure vibrations so as to allow the horizontal flexure vibrations to have a required amplitude.

In other words, it is impossible to steadily control and shape the trajectory, as required, of the elliptical vibrations drawn by the edge of a tool such as the cutting tool.

Consequently, there arises a disadvantage, due to the fact that the elliptical vibration trajectory drawn by the tool edge cannot be shaped as required, that the workpiece cannot be processed with high precision through elliptical vibrations.

SUMMARY OF THE INVENTION

One object of the present invention is to provide a method of controlling an elliptical vibrator for processing a workpiece through elliptical vibrations of a tool. An elliptical vibration trajectory drawn by an edge of the tool can be controlled with steadiness so as to shape the trajectory as required, and thus the workpiece can be processed with high precision through the elliptical vibrations.

A method of controlling an elliptical vibrator according to the present invention is used for processing a workpiece by means of a tool through elliptical vibrations thereof, vibrations in two directions being synthesized by an elliptical vibratory processing apparatus for causing elliptical vibrations and transmitting the elliptical vibrations to the tool. An amount of interference by vibrations in one of the two directions with vibrations in the other direction is correctively eliminated from the vibrations in that other direction.

According to the method of controlling an elliptical vibrator of the present invention, the vibrations in the two directions are vibrations in any of flexure vibration mode, longitudinal vibration mode, torsional vibration mode, shear vibration mode, and radial vibration mode.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

According to the present invention, an elliptical vibratory apparatus having a tool is used for processing a workpiece by means of the tool through elliptical vibrations. The apparatus includes a control mechanism from which drive signals with respect to X and Y directions are transmitted respectively to driving piezoelectric elements, in order to cause flexure vibrations in X and Y directions of an elliptical vibrator. Here, as vibrations in one direction interfere with vibrations in the other direction, this interference is correctively eliminated in the following way.

For the tool interference caused by flexure vibrations in X direction to flexure vibrations in Y direction, the control mechanism transmits a command, i.e., correction signal, for eliminating the interference encountered by the vibrations in Y direction, to a portion for generating vibrations in Y direction. Then, a component of the interference encountered by the vibrations in Y direction can correctively be eliminated from the flexure vibrations in Y direction.

Similarly, for tool interference caused by the flexure vibrations in Y direction to the flexure vibrations in X direction, the control mechanism transmits a correction signal for eliminating the interference encountered by the vibrations in X direction to a portion generating X-direction vibrations. Accordingly, a component of the interference encountered by the vibrations in X direction can correctively be eliminated from the flexure vibrations in X direction.

In this way, the tool interference in X and Y directions can correctively be removed. Consequently, it is possible to steadily control and shape, as required, a trajectory of elliptical vibrations that is drawn by an edge of the tool attached to the elliptical vibrator, and accordingly process the workpiece with high precision through elliptical vibrations.

The present invention is now described in detail in conjunction with drawings of an embodiment.

Figure 1:
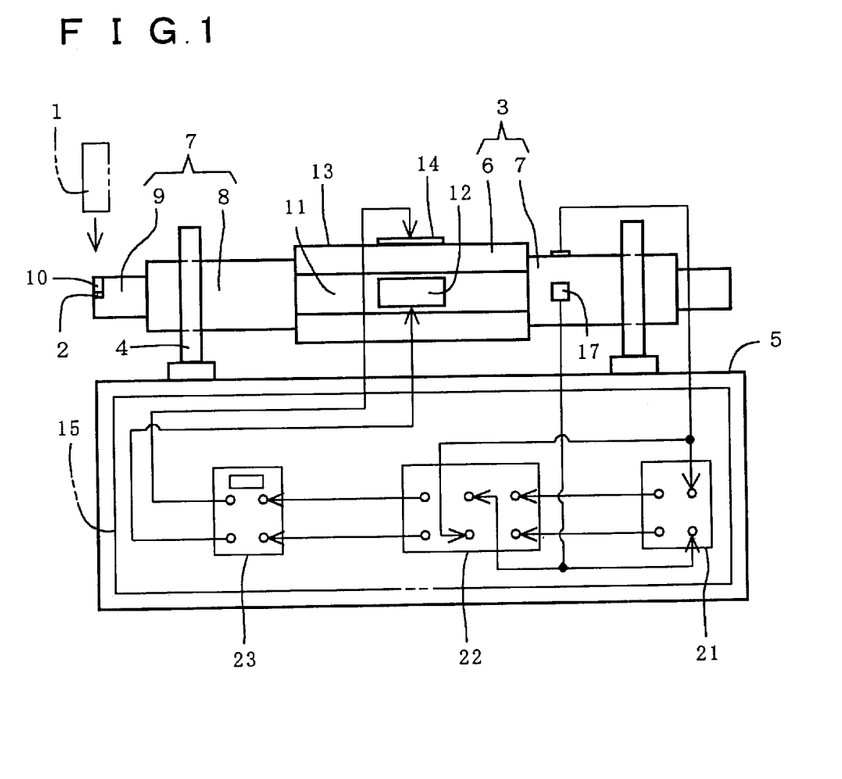
FIG. 1 is a schematic front view of an elliptical vibratory cutting apparatus to which applied a method of controlling an elliptical vibrator according to the present invention.
Figure 2:
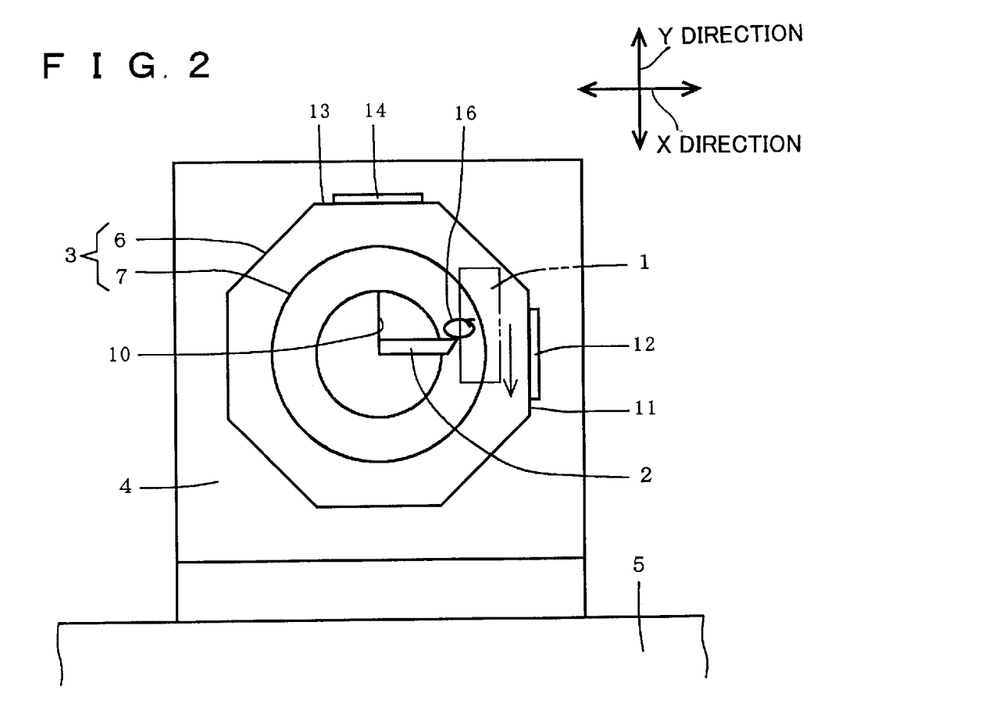
FIG. 2 is a schematic side view of the apparatus shown in FIG. 1.

FIGS. 1 and 2 show a cutting apparatus to which a method of controlling an elliptical vibrator is applied according to the present invention.

FIG. 3 shows a generally conventional cutting part of the apparatus shown in FIGS. 1 and 2.

Figure 4A:
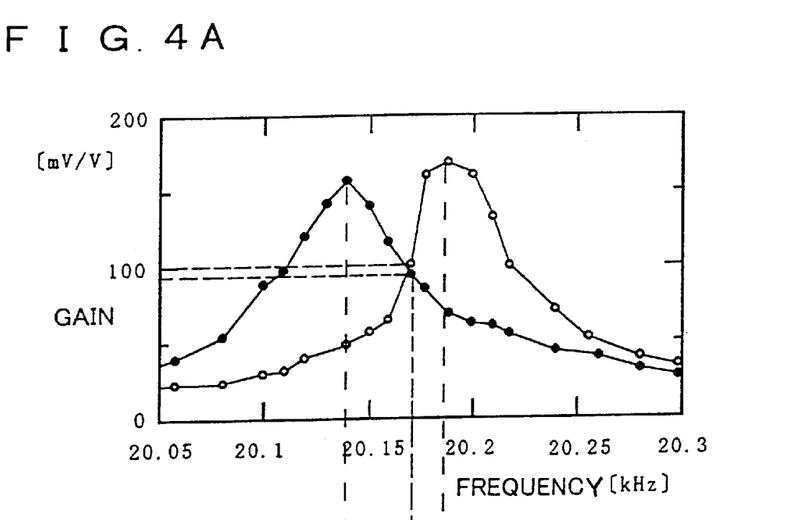
FIGS. 4A and 4B illustrate vibratory characteristics of the cutting tool and a control method of automatic track of resonance frequency, FIG. 4A indicating gain relative to frequency while FIG. 4B indicating phase delay relative to frequency.
Figure 4B:
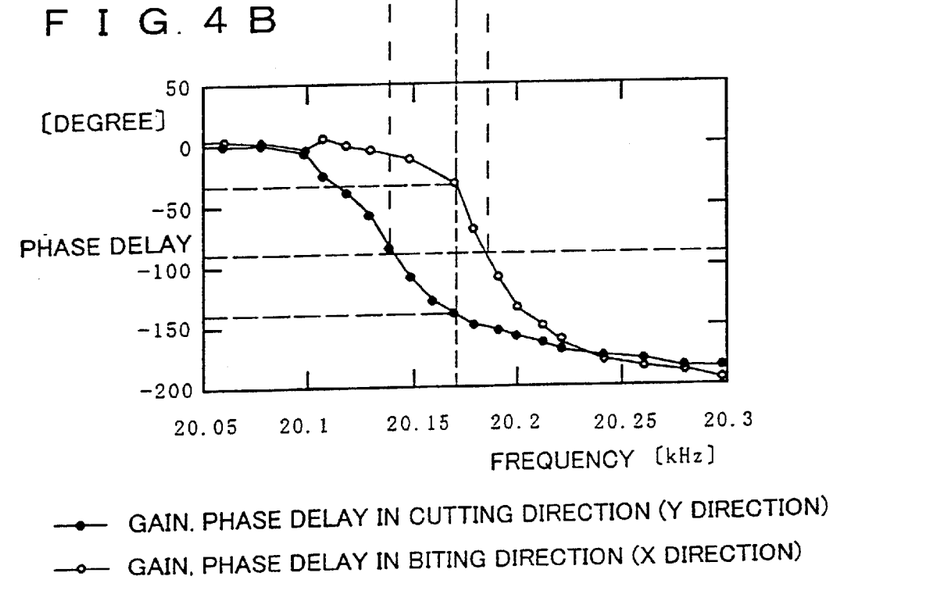

FIGS. 4A and 4B illustrate vibratory characteristics of a cutting tool and a control method of automatic track of resonance frequency.

Figure 5:
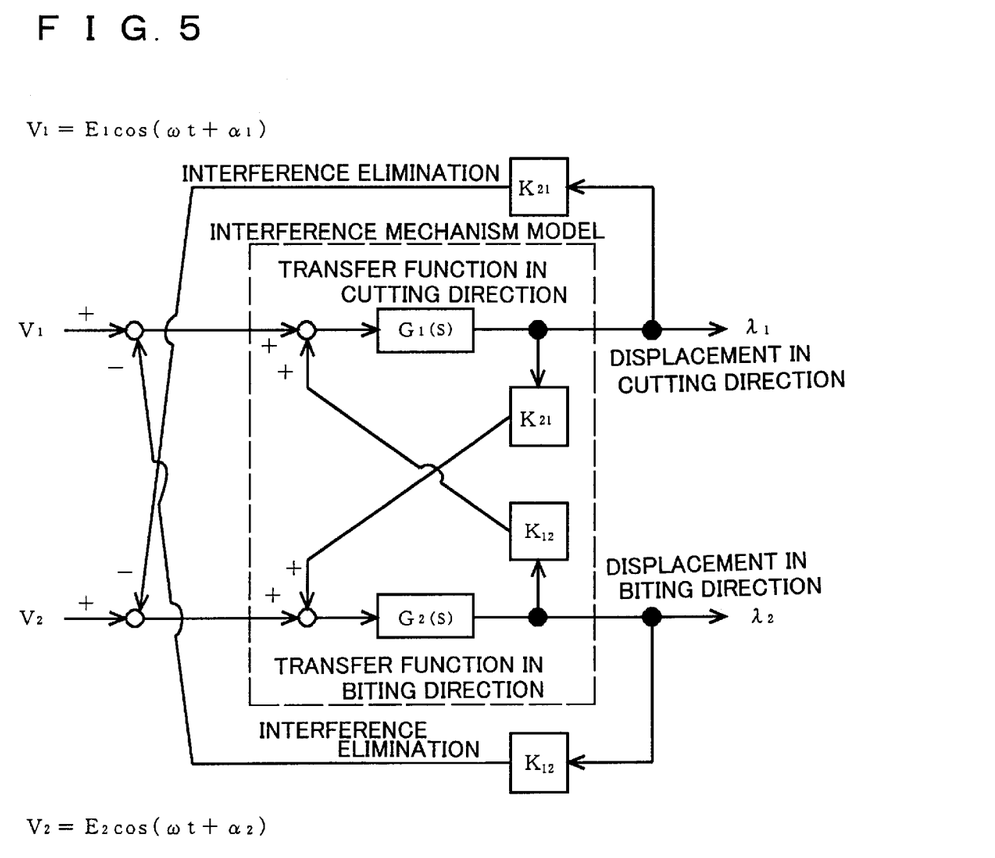
FIG. 5 illustrates a method of eliminating interference for the method of controlling the elliptical vibrator according to the present invention.

FIG. 5 illustrates a method of eliminating interference for the method of controlling the elliptical vibrator according to the present invention.

The elliptical vibratory cutting apparatus shown in FIGS. 1 and 2 includes a cutting tool 2 such as bit for cutting a workpiece 1, steel product for example, an elliptical vibrator 3 for causing elliptical vibrations to cutting tool 2, two supporting members 4 for supporting elliptical vibrator 3 with a predetermined space therebetween, and a base 5 on which supporting members 4 are placed.

Elliptical vibrator 3 has its central part formed of a body 6 in the shape of an octagonal prism. Step horns 7 protrude respectively from both ends of body 6 in the shape of the octagonal prism, for amplifying elliptical vibrations. Step horns 7 are each constituted of a larger cylindrical horn 8 and a smaller cylindrical horn 9 provided to larger horn 8.

One of the step horns 7 of elliptical vibrator 3 has its end (of smaller horn 9) that is provided with a mount 10 to which cutting tool 2 is attached. Step horns 7 (larger horns 8) can be supported respectively by supporting members 4.

Octagonal prismatic body 6 has its vertical face 11 on which a (driving) piezoelectric element 12 is provided for generating elliptical vibrations, as well as its horizontal face 13 on which a piezoelectric element 14 is also provided for generating elliptical vibrations.

Vertical face 11 and horizontal face 13 that form respective sides of octagonal prismatic body 6 are orthogonal to each other. The vertical and horizontal faces serve respectively as mounts on which the piezoelectric elements are attached. Here, piezoelectric elements 12 and 14 are not necessarily placed respectively on vertical face 11 and horizontal face 13, and thus the piezoelectric elements may be provided on respective faces orthogonal to each other so that flexure vibrations are generated in directions orthogonal to each other. In addition, the flexure vibrations are not necessarily generated in the orthogonal directions and may be in respective directions that form an angle except for 0° and 180°.

The apparatus as described above further includes a control mechanism 15 for individually driving and controlling piezoelectric elements 12 and 14. By means of this control mechanism 15, a sinusoidal voltage having a predetermined frequency, a predetermined amplitude and a predetermined phase (predetermined phase difference) can be applied to each of the piezoelectric elements 12 and 14.

Specifically, the sinusoidal voltage with a predetermined phase difference is applied to piezoelectric elements 12 and 14 each for individually driving piezoelectric elements 12 and 14. Then, flexure vibrations can be caused to elliptical vibrator 3. The flexure vibrations are generated, according to the sinusoidal voltage, on supporting members 4 as their center. The flexure vibrations of elliptical vibrator 3 are mechanically resonated and synthesized. Thus, a trajectory, in a required shape, of elliptical vibrations can be produced on mount 10 on the end of step horn 7.

In this way, by elliptical vibrator 3, elliptical vibrations can be synthesized and transmitted to cutting tool 2 (mount 10), so as to allow the end (cutting edge) of cutting tool 2 to draw trajectory 16 (see FIG. 3) of the elliptical vibrations in a required shape and thus periodically vibrate elliptically (rotate along the elliptical trajectory).

Trajectory 16 of the elliptical vibrations can be shaped arbitrarily as required by the elliptical vibratory cutting apparatus. Further, the sinusoidal voltage applied to piezoelectric elements 12 and 14 of elliptical vibrator 3 can have a frequency of 20 KHz, an amplitude (voltage) of 200 V and a phase difference of 900°, for example.

Accordingly, as shown in FIG. 3, in order to cut workpiece 1 by means of cutting tool 2, cutting tool 2 (cutting edge thereof) is elliptically vibrated while workpiece 1 is relatively moved in cutting direction A (Y direction in FIG. 2) at a predetermined cutting speed (m/min), so as to bite workpiece 1 in a biting direction indicated by D (X direction in FIG. 2).

In FIG. 3, the direction indicated by B, which is the same as cutting direction A, is the direction of a main cutting force, and the direction indicated by C is the direction of a feed force.

At predetermined positions of elliptical vibrator 3 of the apparatus shown in the drawings, detectors (sensor) 17 are provided for detecting flexure vibrations in X and Y directions respectively. Detectors 17 detect flexure vibrations (elliptical vibrations) of elliptical vibrator 3 to transmit a detection signal indicating the vibratory state to control mechanism 15.

Then, the amount of interference as described above, by vibrations in X (Y) direction, with vibrations in Y (X) direction, can be measured by means of detectors 17.

According to this embodiment, piezoelectric elements for measurement or optical displacement meters (photosensors), for example, may be employed as detectors 17 as described above.

When a predetermined voltage is applied to X-direction-drive piezoelectric element 12, step horns 7 flex not only in X direction but also in Y direction. If the piezoelectric elements are employed as detectors 17, the flexure of the step horns deforms both of the detector 17 for detecting flexure vibrations in X direction and the detector 17 for detecting flexure vibrations in Y direction, and accordingly voltages are generated from the detectors. At this time, the voltage of the detector 17 for detecting Y-direction flexure vibrations can be detected in order to detect the amount of interference with vibrations in Y direction.

The vibratory state (e.g. amplitude, amount of interference) can indirectly be measured by measuring, by means of an amplifying unit 23, the amount of current when vibrations are being generated.

Control mechanism 15 includes a control unit 21 for implementing three control systems, i.e., constant-amplitude control, constant-phase-difference control and automatic tracking of resonance frequency, in order to control trajectory 16 of elliptical vibrations.

Then, a predetermined amplitude command and a predetermined phase command are given to control unit 21 while resonance tracking can automatically be done by control unit 21. By the three control systems implemented by control mechanism 15, trajectory 16 of elliptical vibrations can stably be shaped as required.

First, the constant-amplitude control is described.

The constant-amplitude control refers to control for maintaining, with stability, a required amplitude (preset target amplitude) of the vibrations in X direction (biting direction D) and Y direction (cutting direction A), for example.

In this way, by this control by control mechanism 15, the amplitude of the waveform of the vibrations measured by detectors 17 can be set to the target amplitude.

Second, the constant-phase-difference control is described.

The constant-phase-difference control refers to control for maintaining, with stability, a required phase difference (preset target phase difference) of the vibrations in X and Y directions, for example.

Thus, by this control by control mechanism 15, the phase difference of the vibrations measured by detectors 17 can be set to the target phase difference.

Third, the automatic tracking of resonance frequency is described.

The cutting operation by the elliptical vibratory cutting apparatus is accomplished through elliptical vibrations, as described above, that are produced by mechanical resonation and synthesis of the flexure vibrations for obtaining trajectory 16 of the elliptical vibrations that is drawn by the cutting edge of cutting tool 2. In order to efficiently vibrate the cutting tool, desirably the frequency of an applied voltage is always equal to the resonance frequency. However, the resonance frequency cannot be specified due to a slight difference between respective resonance frequencies of the cutting tool with respect to the two directions.

Here, vibratory characteristics of the cutting tool are described with reference to FIGS. 4A and 4B. FIGS. 4A and 4B show measurements of the vibratory characteristics of the cutting tool that are taken by detectors 17 (piezoelectric elements for measurement). FIG. 4A shows gain with respect to cutting direction (Y direction) and biting direction (X direction) and FIG. 4B shows phase delay with respect to the cutting direction (Y direction) and the biting direction (X direction).

It is seen from FIGS. 4A and 4B that, for both of the vertical and horizontal directions, the maximum amplitude is attained when the phase delay is approximately −90°. Then, by control by the control system mentioned above, the average phase delay regarding the two directions is set to −90° in order to achieve a sufficient vibratory amplitude for both of the two directions. Specifically, for each direction, the phase difference between an output waveform from detector 17 and an input waveform from control unit 21 is measured, and the average of respective phase delays with respect to the two directions is maintained at an arbitrary target value (e.g. −90°), by adjusting the frequency of the voltage applied to the driving piezoelectric elements. Here, the average phase delay may be a weighed average. In this case, an arbitrary manner of weighting can be applied.

In this way, the control is exercised for keeping the average phase delay of the two directions, i.e., X and Y directions, at approximately −90°. This control is referred to as the automatic tracking of resonance frequency.

Control mechanism 15 further includes an interference eliminating unit 22 for correctively eliminating an amount of interference with flexure vibrations in the X and Y directions. Then, the amount of interference with the flexure vibrations in X and Y directions can correctively be removed by interference eliminating unit 22.

Specifically, the amount of interference, by flexure vibrations in X direction, with flexure vibrations in Y direction, is eliminated by controlling the voltage applied to Y-direction-drive piezoelectric element 14 for canceling the amount of interference. The amount of interference can thus be removed correctively.

To control unit 21 and interference eliminating unit 22 of control mechanism 15 as described above, detection signals from detectors 17 can be input.

Description of FIG. 5 is now given below.

FIG. 5 illustrates a mechanism of interference (tool interference) with vibrations in X and Y directions as well as an interference eliminating system (interference eliminating unit 22) of the apparatus shown in FIGS. 1–3.

The tool interference by flexure vibrations in X direction is specifically described. Here, it is supposed that vibrating voltage Vi represented by $E_1 \cdot \cos(\omega t + \alpha_1)$ is applied to only the X-direction-drive piezoelectric element 12.

The piezoelectric action causes a vibrating force represented by $F_1 \cdot \cos(\omega t + \alpha_1)$ to piezoelectric element 12, and this vibrating force causes, to elliptical vibrator 3, a displacement in X direction, $\lambda_1 \cdot \cos(\omega t + \alpha_1 - \phi)$.

On the other hand, this displacement causes a vibrating force (tool interference), represented by $K_{21} \cdot \lambda_1 \cdot \cos(\omega t + \alpha_1 - \phi)$, in Y direction orthogonal to X direction.

That displacement, in other words, the displacement in X direction causing the vibrating force in Y direction has a waveform which can be detected by detector 17.

In order to correctively eliminate the displacement, a vibrating voltage of $P_{21} \cdot \lambda_1 \cdot \cos(\omega t + \alpha_1 - \phi)$ is applied to Y-direction-drive piezoelectric element 14. Then, this vibrating voltage causes a vibrating force of $P_{21} \cdot F_2 / E_2 \cdot \lambda_1 \cdot \cos(\omega t + \alpha_1 - \phi)$ in Y direction.

At this time, adjustments are made to achieve $P_{21} \cdot F_2 / E_2 = -K_{21}$ to cancel the tool interference.

Moreover, as shown by the interference mechanism model in FIG. 5, the amount of interference specific to this system that is included in the displacement which is caused by the vibrating force in X direction is entered, as a disturbance component, to the vibrating force in Y direction and is accordingly taken in transfer function $G_2(S)$, in consideration of the interference removal.

Tool interference which is caused when vibrating voltage $V_2$ represented by $E_2 \cos(\omega t + \alpha_2)$ is applied to only the piezoelectric element 14 for Y-direction-drive can also be eliminated correctively by canceling the interference as done with respect to X direction as described above.

In this way, the elliptical vibratory cutting apparatus (interference eliminating unit 22 of control mechanism 15) can efficiently and correctively remove the tool interference with respect to both of the two directions, X and Y directions, and thus cut, with stability, workpiece 1 by means of cutting tool 2 through elliptical vibrations thereof.

Accordingly, a sinusoidal voltage having a predetermined phase difference is applied from control mechanism 15 to piezoelectric elements 12 and 14 each for driving them. Then, flexure vibrations of elliptical vibrator 3 are generated in X and Y directions respectively according to piezoelectric elements 12 and 14. The flexure vibrations are synthesized to cause elliptical vibrations of cutting tool 2 on mount 10 of elliptical vibrator 3. Thus, workpiece 1 can be cut by means of cutting tool 2 through elliptical vibrations thereof.

At this time, the flexure vibrations in the two directions interfere with each other, and the amount of this tool interference can be cancelled and accordingly eliminated correctively by interference eliminating unit 22 of control mechanism 15 as described above.

In this way, the workpiece is cut by means of the cutting tool through elliptical vibrations. At this time, the trajectory of the elliptical vibrations that is drawn by the edge of the cutting tool can be controlled with stability so that the trajectory has a required shape. Consequently, the workpiece can be processed with high precision by the elliptical vibratory cutting operation.

Amplifying unit (amplifier) 23 of control mechanism 15 described above amplifies the voltage from interference eliminating unit 22 for supplying the amplified voltage to piezoelectric elements 12 and 14.

The elliptical vibratory cutting apparatus is herein described above as an elliptical vibratory processing apparatus. However, the present invention is applicable to any processing apparatus for grinding, abrading, cutting and welding for example. In addition, any tools used for these processing operations may elliptically be vibrated. For example, a blade for the cutting operation and a buff or abrasive pad for the abrading operation may elliptically be vibrated. Moreover, a workpiece to be processed may elliptically be vibrated. Alternatively, the present invention is effective as a method for controlling a resonance ultrasonic motor.

In addition, according to the description above, the flexural vibrations are used for controlling the elliptical vibrator. Alternatively, two actuator systems such as piezoelectric elements may be used for allowing each piezoelectric element to directly cause displacement of the elliptical vibrator. In this case, piezoelectric elements each having a constant phase difference displace and accordingly vibrate the elliptical vibrator in respective directions that are orthogonal to each other, so that so-called longitudinal vibrations are generated. Instead of this, so-called torsional vibrations may be generated from torsional deformation caused by actuators. Further, except for the vibration modes mentioned above, any vibration mode such as shear vibrations and radial vibrations may be used. In other words, any deformation may be caused for producing displacement from which such vibrations are generated. The present invention is applicable to any combination of these vibration modes. In any case, the amount of interference, by vibrations in one direction, with vibrations in another direction, is correctively eliminated from the vibrations in that another direction.

Additionally, for any of the vibration modes described above, one direction and another direction in which vibrations are generated are not necessarily orthogonal to each other, and the angle formed by these directions may be any angle except for 0° and 180°.

According to the present invention, a workpiece is processed by means of a tool through elliptical vibrations, and the trajectory of the elliptical vibrations that is drawn by an edge of the tool can be controlled with stability so that the trajectory has a required shape. Thus, the present invention is highly effective in that the workpiece can be processed with high precision through the elliptical vibrations.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of controlling an elliptical vibrator used for cutting a workpiece by means of a tool, comprising:
   synthesizing respective first and second vibrations in first and second directions for causing elliptical vibrations of said elliptical vibrator and transmitting the elliptical vibrations to said tool, wherein an interference is caused in said first vibrations in said first direction by said second vibrations in said second direction, and
   eliminating an amount of said interference from said first vibrations in said first direction.

2. The method of controlling an elliptical vibrator according to claim 1, wherein said vibrations in said first and second directions are vibrations in any of a flexure vibration mode causing flexure of said elliptical vibrator, a longitudinal vibration mode causing vibrations in a longitudinal direction of said elliptical vibrator, a torsional vibration mode causing torsional vibration of said elliptical vibrator, a shear vibration mode causing shear vibration of said elliptical vibrator, and a radial vibration mode causing vibrations in a radial direction of said elliptical vibrator.

3. The method of controlling an elliptical vibrator according to claim 1,
   wherein said amount of interference is an amount of interference vibrations caused in said first vibrations in said first direction by said second vibrations in said second direction, and
   wherein said eliminating of said amount of interference comprises:
      detecting said second vibrations in said second direction, and
      controlling said first vibrations in said first direction based on a result of said detecting of said second vibrations, so as to cancel said amount of interference in said first vibrations caused by said second vibrations.

4. A method of controlling an elliptical vibrator used for cutting a workpiece by means of a tool, vibrations in first and second directions being synthesized for causing elliptical vibrations of said elliptical vibrator and transmitting the elliptical vibrations to said tool, said method comprising the steps of:
   applying first and second driving voltages to first and second piezoelectric elements for driving said elliptical vibrator in said first and second directions respectively;
   detecting a first amount of vibrations of said elliptical vibrator generated in said first direction and a second amount of vibrations of said elliptical vibrator generated in said second direction, wherein said vibrations in said first direction cause a second vibrating force in said second direction and said vibrations in said second direction cause a first vibrating force in said first direction;
   converting said first amount of vibrations in said first direction into a first voltage signal adapted to cancel said second vibrating force in said second direction, and converting said second amount of vibrations in said second direction into a second voltage signal adapted to cancel said first vibrating force in said first direction; and applying respective first and second corrective voltages based on said first and second voltage signals, respectively to said second and first piezoelectric elements for driving said elliptical vibrator in said second and first directions, for vibrating said elliptical vibrator to cancel said second and first vibrating forces, in addition to said applying of said second and first driving voltages.

5. A method of operating a vibratory tool apparatus including a vibratory tool, comprising the steps:
   a) generating a first vibration in a first direction and generating a second vibration in a second direction that is non-parallel to said first direction so that said first and second vibrations together form an elliptical vibration, and applying said elliptical vibration to said vibratory tool, wherein said first vibration in said first direction causes a first vibratory interference in said second direction, and wherein said second vibration in said second direction causes a second vibratory interference in said first direction;
   b) determining a first value of said first vibratory interference based on said first vibration, and determining a second value of said second vibratory interference based on said second vibration;
   c) modifying said generating of said first vibration in said first direction dependent on and responsive to said second value of said second vibratory interference caused by said second vibration, so as to reduce or cancel-out said second vibratory interference in said first direction; and
   d) modifying said generating of said second vibration in said second direction dependent on and responsive to said first value of said first vibratory interference caused by said first vibration, so as to reduce or cancel-out said first vibratory interference in said second direction.

6. A method of operating a vibratory tool apparatus including a vibratory tool, comprising the steps:
   a) generating a first vibration in a first direction and generating a second vibration in a second direction that is non-parallel to said first direction so that said first and second vibrations together form an elliptical vibration, and applying said elliptical vibration to said vibratory tool, wherein said first vibration in said first direction causes a first vibratory interference in said second direction, and wherein said second vibration in said second direction causes a second vibratory interference in said first direction;
   b) measuring a first measured value of said first vibration in said first direction, and measuring a second measured value of said second vibration in said second direction;
   c) feeding back a first function of said first measured value of said first vibration, and modifying said generating of said second vibration dependent on and responsive to said first function of said first measured value of said first vibration so as to reduce or cancel-out said first vibratory interference in said second direction; and
   d) feeding back a second function of said second measured value of said second vibration, and modifying said generating of said first vibration dependent on and responsive to said second function of said second measured value of said second vibration so as to reduce or cancel-out said second vibratory interference in said first direction.

* * * * *

UNITED STATES PATENT AND TRADEMARK OFFICE
CERTIFICATE OF CORRECTION

PATENT NO. : 6,776,563 B2
DATED : August 17, 2004
INVENTOR(S) : Shamoto et al.

It is certified that error appears in the above-identified patent and that said Letters Patent is hereby corrected as shown below:

Title page,
Item [*] Notice, should read:
-- Subject to any disclaimer, the term of this patent is extended or adjusted under 35 U.S.C. 154(b) by 69 days. --

Signed and Sealed this

Twenty-eighth Day of June, 2005

JON W. DUDAS
*Director of the United States Patent and Trademark Office*

UNITED STATES PATENT AND TRADEMARK OFFICE
CERTIFICATE OF CORRECTION

PATENT NO. : 6,776,563 B2  
DATED : August 17, 2004  
INVENTOR(S) : Shamoto et al.

Page 1 of 1

It is certified that error appears in the above-identified patent and that said Letters Patent is hereby corrected as shown below:

<u>Title page,</u>
Item [76], Inventors, should read:
-- Eiji Shamoto, Nagoya-shi, Aichi (JP);
  Norikazu Suzuki, Nagoya-shi, Aichi (JP);
  Toshimichi Moriwaki, Kobe-shi, Hyogo (JP);
  Makoto Matsuo, Kyoto-shi, Kyoto (JP); --.
Item [56], References Cited, FOREIGN PATENT DOCUMENTS, should read
-- DE   100 04 062   8/2000 --.

<u>Column 6,</u>
Line 31, after "voltage", replace "Vi" by -- $V_1$ --;
Line 60, after "by", replace "$E_2 cos(\omega t + \alpha_2)$" by -- $E_2 \cdot cos(\omega t + \alpha_2)$ --.

Signed and Sealed this

Eighteenth Day of April, 2006

JON W. DUDAS
*Director of the United States Patent and Trademark Office*